United States Patent
Cockcroft et al.

(10) Patent No.: US 7,827,529 B2
(45) Date of Patent: Nov. 2, 2010

(54) SYSTEM AND METHOD FOR GENERATING A PROBABILITY DISTRIBUTION OF COMPUTER PERFORMANCE RATIOS

(75) Inventors: Adrian N. Cockcroft, Los Gatos, CA (US); Brian L. Wong, Gordonsville, VA (US); Allan Packer, Glen Osmond (AU)

(73) Assignee: Oracle America, Inc., Redwood Shores, CA (US)

( * ) Notice: Subject to any disclaimer, the term of this patent is extended or adjusted under 35 U.S.C. 154(b) by 1079 days.

(21) Appl. No.: 11/291,184

(22) Filed: Nov. 30, 2005

(65) Prior Publication Data

US 2007/0124353 A1     May 31, 2007

(51) Int. Cl.
G06F 9/44     (2006.01)
(52) U.S. Cl. .................. 717/124; 717/126; 717/127
(58) Field of Classification Search .................. 717/124, 717/126, 127
See application file for complete search history.

(56) References Cited

U.S. PATENT DOCUMENTS

| | | | | |
|---|---|---|---|---|
| 5,303,166 A * | 4/1994 | Amalfitano et al. | ......... | 702/186 |
| 5,701,471 A * | 12/1997 | Subramanyam | ............. | 707/200 |
| 6,505,249 B1 * | 1/2003 | Rehkopf | ................ | 709/224 |
| 2002/0116152 A1 * | 8/2002 | Tanaka | ................. | 702/186 |
| 2004/0115871 A1 * | 6/2004 | Kawamoto | ................. | 717/126 |
| 2004/0172374 A1 * | 9/2004 | Forman | ................ | 706/12 |
| 2005/0216480 A1 * | 9/2005 | Wefers et al. | ................ | 707/100 |
| 2007/0093257 A1 * | 4/2007 | McDougall et al. | ....... | 455/456.1 |
| 2007/0174709 A1 * | 7/2007 | Sluiman et al. | ................ | 714/38 |
| 2007/0271547 A1 * | 11/2007 | Gulko et al. | ................. | 717/106 |
| 2008/0216053 A1 * | 9/2008 | Sluiman et al. | ............. | 717/124 |

OTHER PUBLICATIONS

Bhandarkar et al.; Performance Characterization of the Pentium Pro Processor; Proceedings of the Third International Symposium on High Performance Computer Architecture; Feb. 1-5, 1997.*
Adrian Cockcroft, et al., "Capacity Planning for Internet Services", 2001, pp. 81-82, 87-91, 95-95, 169-187, Sun Microsystems.
Brian L. Wong, "Characterizing Open Systems Workloads and Comparing Them With MVS", in CMG98 Proceedings vol. 1, 1998, pp. 63-69, The Computer Measurement Group.

* cited by examiner

*Primary Examiner*—Wei Y Zhen
*Assistant Examiner*—Qamrun Nahar
(74) *Attorney, Agent, or Firm*—Park, Vaughan, Fleming, Dowler LLP

(57) ABSTRACT

A system and method for generating a probability distribution indicating the probability of a range of performance ratios between computer systems. Benchmark and/or other testing results are obtained for both computer systems. For each test, a ratio of one system's performance to the other is calculated. The ratios and/or testing results may be weighted. From the performance ratios, a histogram is produced to indicate the probabilities of achieving the various ratios. Based on the distribution of probabilities, a particular performance ratio can be predicted with a corresponding level of confidence, and used for capacity planning or configuring a computing environment.

11 Claims, 2 Drawing Sheets

SYSTEM AND METHOD FOR GENERATING A PROBABILITY DISTRIBUTION OF COMPUTER PERFORMANCE RATIOS

BACKGROUND

This invention relates to the field of computer systems. More particularly, a system and methods are provided for generating a probability distribution of performance ratios of computer systems.

Computer system performance is typically measured using benchmarks. Different benchmark specifications produce different estimates of a system's capacity or performance. For example, one benchmark may be designed to test a computer system's performance for floating point operations. Another benchmark may be configured to determine the system's performance when simulating a database environment.

A given benchmark result usually comprises a single value, which may be derived from multiple micro-benchmarks or values generated during execution of the benchmark specification. Marketing pressures may dictate that the benchmarked computer system be perfectly or nearly perfectly optimized, so as to produce the most attractive result. However, the single resulting value from such a benchmark operation may be overly optimistic from the point of view of a customer or organization attempting to perform capacity planning or sizing. Similarly, if the system is poorly configured, a benchmark result may be overly pessimistic.

For example, if a customer plans to employ the computer system for a particular purpose (e.g., serving an application, operating a database), the customer's configuration of the computer system may differ from the configuration that was benchmarked. And, the load generated by the customer's planned use may be too specialized to allow much reliance to be placed on the benchmark result. Thus, the benchmark result may not accurately predict how the computer system will perform within the customer's environment.

SUMMARY

In one embodiment of the invention, a system and methods are provided for generating a probability distribution indicating the probability of a range of performance ratios between computer systems.

In this embodiment, benchmark and/or other testing results are obtained for both computer systems. For each test, the ratio of one system's performance to the other is calculated. The ratios and/or testing results may be weighted. For example, the results of benchmarks closely related to the planned use of a computer system may be weighted more heavily than other benchmark results.

From the performance ratios, a histogram is produced to indicate the probabilities of achieving the various ratios. Based on the distribution of probabilities, a particular performance ratio can be predicted with a corresponding level of confidence, and used for capacity planning, configuring a computing environment or other purposes.

DETAILED DESCRIPTION

Figure 1:
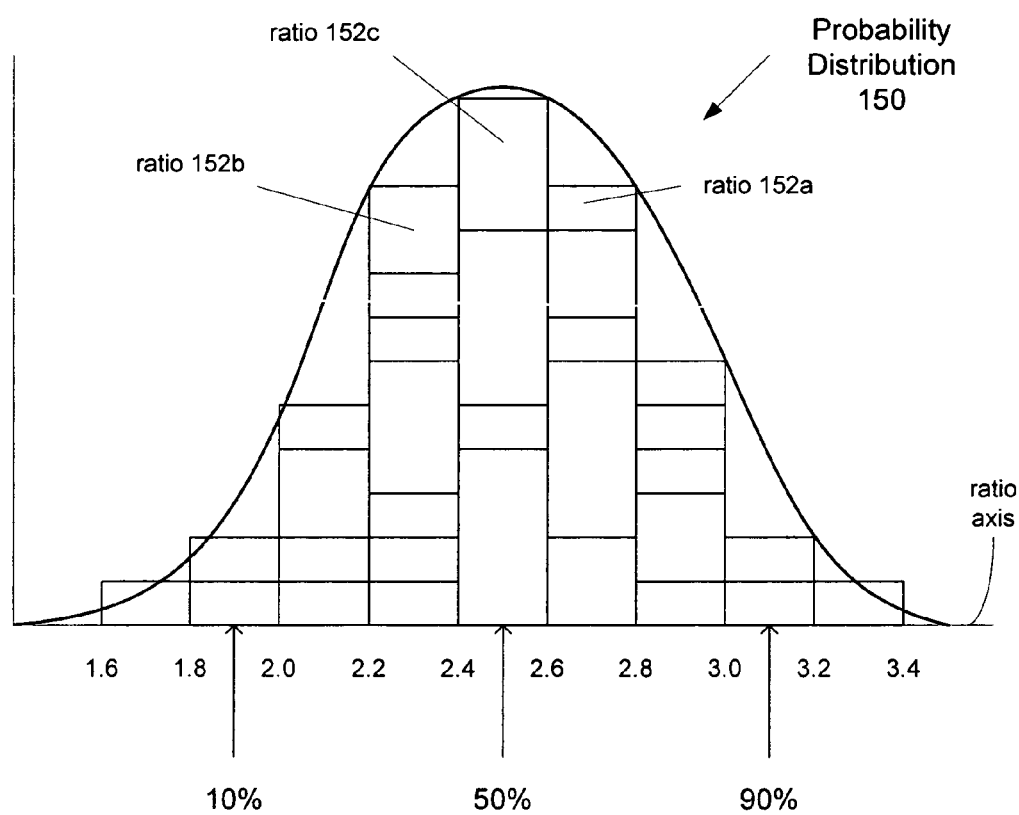
FIG. 1 illustrates a sample benchmark result table for generating a probability distribution, and a probability distribution, according to one embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for generating a probability distribution for determining or estimating the performance ratio between two computer systems. The top percentile of the distribution represents a "best-case" scenario in which one computer is as much faster as possible compared to another, while the bottom percentile represents a "worst-case" scenario in which the one computer is as much slower as possible compared to the other. The median of the distribution may represent the average performance of the one that may be expected, relative to the other.

Thus, this embodiment of the invention may be implemented to determine how the performance of one (e.g., newer) computer may compare to the performance of another (e.g., older) computer. Generating a distribution of performance ratios as described herein may facilitate an organization's capacity planning or sizing/configuring of their computing assets.

For example, an organization operating a computer system in which performance is critical may require high confidence that a new computer system will provide a particular level of performance. Adopting or assuming a performance ratio from the lower end of the distribution of performance ratios may instill a high degree of confidence that the new system's performance will be at least as good as the selected ratio. In contrast, the median value of the distribution of performance ratios represents the point at which there is an equal chance that performance will be better or worse than the indicated value.

To generate the probability distribution, benchmark or other test results from both computer systems are obtained and compared. For each benchmark, the ratio of one computer's result to the other computer's result is calculated. Some or all ratios may be weighted, depending on how relevant the corresponding benchmark is. For example, benchmarks related to database performance may be weighted heavily for a computer system that is designed to operate a database management system (DBMS).

A histogram of the range of performance ratios is then produced. The histogram indicates which performance ratios were most prevalent in the comparison of benchmark results. For two very similar computer systems (e.g., same types and quantity of processors, same amount of memory), the distribution of performance ratios may be very narrow. For two dissimilar computer systems, the distribution may be very wide.

By weighting some or all performance ratios, the height of the distribution curve may be altered. The width, however, will depend on the variation between performance ratios, not the weighting.

FIG. 1 depicts a table for gathering benchmark or other testing results in an illustrative embodiment of the invention. In this embodiment, multiple benchmarks are executed on two computer systems. For example, a manufacturer may implement this embodiment of the invention in order to inform customers of the differences in performance that may be expected between an older model computer system and a newer model.

Results table 102 may be used to record the various system configurations that are tested, as well as the results of benchmarks and/or other tests executed on those configurations. In the illustrated embodiment, the system configuration parameters that are recorded include machine type (e.g., model number), quantity of processors, processor speed and operating system version. In other embodiments of the invention, other configuration parameters (e.g., memory size, communication bandwidth) may be recorded instead of, or in addition to, those listed in table 102.

For each system configuration, benchmarks 1-n are executed. The benchmarks may include well-known benchmarks (e.g., from TPCC, SPEC), micro-benchmarks (i.e., tests performed as part of a larger or comprehensive benchmark), tests of actual applications, etc. For example, the SPEC CINT2000 benchmark may involve multiple micro-benchmarks, the results of which are combined to produce the single, publishable, CINT2000 result. The individual elements of CINT2000 and/or the micro-benchmark results may be used for purposes of generating probability distribution 150.

Figure 2:
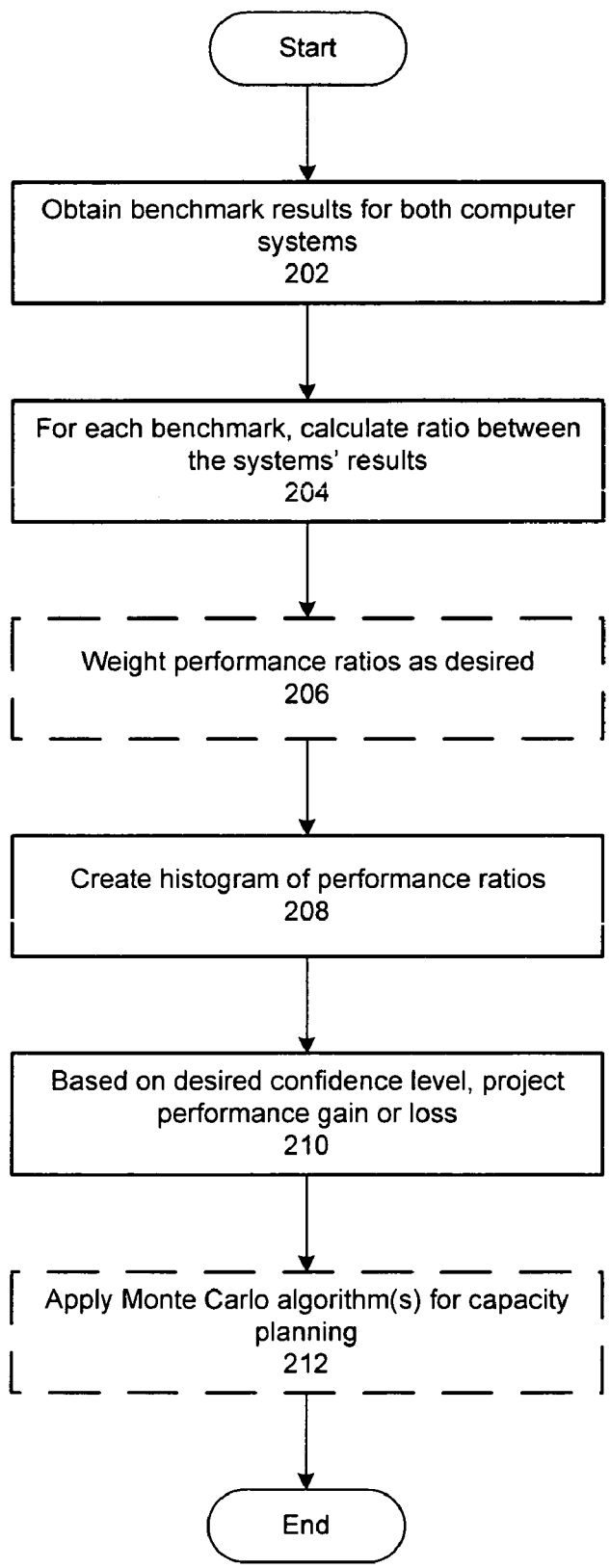
FIG. 2 is a flowchart illustrating one method of generating the probability distribution of FIG. 1, in accordance with an embodiment of the invention.

Probability distribution 150 is an illustrative distribution of the computer systems' performance ratios that may be generated. FIG. 2 demonstrates a method of generating and using probability distribution 150.

In operation 202, benchmark results are obtained for both computer systems (e.g., from tables such as results table 102).

In operation 204, for each benchmark or test for which results are available for both systems, a performance ratio of the two computer systems' results is calculated. Illustratively, the newer system's result may simply be divided by the older system's result.

However, each benchmark may be executed multiple times for a particular configuration of a computer system. In this case, the median, average or geometric mean of the multiple results may be used to calculate the performance ratio. In other embodiments, the best (or worst) of the multiple results may be used. In yet another embodiment, all results for a particular benchmark or test, across all configurations of a computer system, may be used as individual elements of the distribution. The performance variations between different runs of the same test are captured by this method. This helps identify computers that have more or less stability in their performance characteristics.

In optional operation 206, any or all of the performance ratios may be weighted. For example, if most purchasers of the new computer system are expected to use the system for compute-intensive workloads, or if probability distribution 150 is to be tailored for a particular customer having compute-intensive workloads, then the performance ratios for benchmarks or tests that exercise the computer system's processors may be weighted heavier than, for example, benchmarks that exercise input/output devices.

As another example, if 50% of the purchasers of the new computer system are expected to employ them as web servers, 30% are expected to use them as mail servers, and 20% are expected to load them with compute-intensive workloads, then the performance ratios may be weighted accordingly.

In operation 208, a histogram is produced from the performance ratios. Techniques for generating histograms are well-known, and virtually any technique may be used in this embodiment of the invention. Weighting the performance ratios may affect the height of the resulting histogram, but does not affect the width of the bins.

In probability distribution 150 of FIG. 1, bins are 0.2 units wide, and each "brick" in the histogram represents a different performance ratio. Weighting was applied to the ratios so that, for example, ratio 152a was not weighted, ratio 152b was weighted twice relative to ratio 152a, and ratio 152c was weighted three times relative to ratio 152a.

Probability distribution 150 reveals that a first computer is faster than a second computer with a distribution that has a 10th percentile of 1.9, a median of 2.5, and a 90th percentile of 3.1. One could say that the first computer is approximately 2.5 times faster than the second computer, based on the median.

To be cautious and have only a 10% chance of being wrong, one could claim that the first computer is at least 1.9 times as fast as the second. To selectively market the first computer for its best case, one could claim with 90% confidence that its performance will be up to 3.1 times that of the second computer.

In operation 210, we project a specific performance level for a desired confidence level. Thus, if a customer just wished to know the average improvement that may be expected, the answer is 250% or 2.5. If, however, the customer needs to know a level of improvement that is much more certain, a corresponding value in the probability distribution would be asserted (e.g., 190% or 1.9).

In operation 212, Monte Carlo or other algorithms may be applied for capacity planning. As one skilled in the art will recognize, Monte Carlo algorithms facilitate the manipulation of imprecise assumptions in the form of distributions. Therefore, the probability distribution generated above may be manipulated using Monte Carlo techniques to determine how many of the new computer systems to purchase.

For example, a customer's computing needs may be expressed in relation to the old computer system. Thus, if the customer's expected load is between 8 and 10 times the capacity of one of the older computer systems, and a new system's performance is estimated at between 1.9 and 3.1 times that of the old system, an appropriate algorithm may be applied to determine how many of the new computer systems to purchase. The answer will depend on the customer's need for certainty or a desired level of confidence.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include computer readable storage medium such as: volatile (e.g., RAM) or non-volatile (e.g., ROM, disk) memory, or both.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of generating a distribution of performance ratios between multiple computer systems, the method comprising:
    in a system that includes at least one microprocessor, application-specific integrated circuit, or programmable logic device:
        for each computer system, obtaining results from multiple tests configured to test performance of the computer systems;
        for each of the multiple tests, calculating a ratio between the computer systems' test results, wherein calculating the ratio involves dividing a result or a combination of results from a first computer system from the multiple computer systems for a given test by a result or a combination of results from a second computer system from the multiple computer systems for the given test;
        weighting one or more of the calculated ratios relative to an expected use of the computer systems by a user;
        generating a histogram from the calculated ratios to indicate a distribution of the calculated ratios; and
        from the histogram, predicting a probability of an expected level of performance of one of the computer systems compared to another of the computer systems.

2. The method of claim 1, further comprising:
    weighting one or more of the test results.

3. The method of claim 2, wherein said weighting comprises:
    weighting a result of a test relatively closely related to a planned use of the computer systems.

4. The method of claim 1, wherein the multiple tests include one or more benchmarks.

5. The method of claim 1, further comprising:
    applying a Monte Carlo algorithm to manipulate the distribution of calculated ratios.

6. A computer readable storage medium storing instructions that, when executed by a computer, cause the computer to perform a method of generating a distribution of performance ratios between multiple computer systems, the method comprising:
    in a system that includes at least one microprocessor, application-specific integrated circuit, or programmable logic device;
        for each computer system, obtaining results from multiple tests configured to test performance of the computer systems;
        for each of the multiple tests, calculating a ratio between the computer systems' test results; wherein calculating the ratio involves dividing a result or a combination of results from a first computer system from the multiple computer systems for a given test by a result or a combination of results from a second computer system from the multiple computer systems for the given test;
        weighting one or more of the calculated ratios relative to an expected use of the computer systems by a user;
        generating a histogram from the calculated ratios to indicate a distribution of the calculated ratios; and
        from the histogram, predicting a probability of an expected level of performance of one of the computer systems compared to another of the computer systems.

7. An apparatus for generating a distribution of performance ratios between computer systems, the apparatus comprising:
    a first set of results of performance tests executed on a first computer system;
    a second set of results of the performance tests executed on a second computer system;
    a processor configured to:
    calculate, for each of the performance tests, a ratio between the computer systems' set of test results, wherein calculating the ratio involves dividing a result or combination of results from the first computer system for a given test by a result or combination of results from the second computer system for the given test;
    weight one or more of the calculated ratios relative to an expected use of the computer systems by a user; and
    generate a histogram from the calculated ratios to indicate a distribution of the calculated ratios; and an output device configured to output a probability of achieving an expected level of performance of the second computer system compared to the first computer system.

8. The apparatus of claim 7, wherein the processor is further configured to weight one or more of the calculated ratios.

9. The apparatus of claim 7, wherein the processor is further configured to weight one or more of the test results.

10. The apparatus of claim 7, wherein the processor is further configured to manipulate the distribution of calculated ratios using a Monte Carlo algorithm.

11. The apparatus of claim 7, wherein the performance tests include one or more benchmarks.

* * * * *

UNITED STATES PATENT AND TRADEMARK OFFICE
CERTIFICATE OF CORRECTION

PATENT NO. : 7,827,529 B2  Page 1 of 1
APPLICATION NO. : 11/291184
DATED : November 2, 2010
INVENTOR(S) : Cockcroft et al.

It is certified that error appears in the above-identified patent and that said Letters Patent is hereby corrected as shown below:

In claim 7 (at column 6, line 36), please delete the word "achieving" so that the line reads --device configured to output a probability of an--

Signed and Sealed this
Third Day of May, 2011

David J. Kappos
*Director of the United States Patent and Trademark Office*